(12) United States Patent
Gocek et al.

(10) Patent No.: US 9,792,140 B2
(45) Date of Patent: Oct. 17, 2017

(54) MAINTENANCE OF A SOFTWARE DISCOVERY CATALOG IN A VIRTUAL MACHINE ENVIRONMENT

(71) Applicant: International Business Machines Corporation, Armonk, NY (US)

(72) Inventors: Pawel Gocek, Cracow (PL); Piotr Kania, Cracow (PL); Marcin Labenski, Cracow (PL); Michal Paluch, Cracow (PL); Tomasz Stopa, Cracow (PL); Artur K. Zezula, Skawina (PL)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 14/637,433

(22) Filed: Mar. 4, 2015

(65) Prior Publication Data

US 2016/0259658 A1    Sep. 8, 2016

(51) Int. Cl.
  *G06F 9/46*    (2006.01)
  *G06F 9/455*   (2006.01)
  *G06F 9/445*   (2006.01)

(52) U.S. Cl.
  CPC ............ *G06F 9/45558* (2013.01); *G06F 8/60* (2013.01); *G06F 2009/45579* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 8,321,948 B2 | 11/2012 | Robinson et al. | |
| 8,543,998 B2 | 9/2013 | Barringer | |
| 8,850,607 B2 | 9/2014 | Koka et al. | |
| 8,856,889 B2 | 10/2014 | Alwar | |
| 8,863,125 B2 | 10/2014 | Ciano et al. | |
| 2009/0276771 A1* | 11/2009 | Nickolov | G06F 9/4856 717/177 |

(Continued)

OTHER PUBLICATIONS

Kim et al., "Management-Based License Discovery for the Cloud", Lecture Notes in Computer Science, vol. 7636, pp. 499-506, 2012, copyright Springer-Verlag Berlin Heidelberg 2012.

(Continued)

*Primary Examiner* — Bradley Teets
(74) *Attorney, Agent, or Firm* — David B. Woycechowsky

(57) ABSTRACT

Software asset management (SAM) for virtual environments performing the following operations: (i) collecting a set of virtual machine (VM) descriptor(s) sets, where each VM descriptor(s) set corresponds to one of the following: a VM appliance or a sealed VM image; (ii) for each VM descriptor(s) set of the set of VM descriptor(s) set(s), determining whether there is a match to an entry in a VM descriptor set/software application mapping data set; and (iii) for each VM descriptor(s) set of the set of VM descriptor(s) set(s), on condition that there is a match, determining an identity of a set of software application(s) in the VM appliance or sealed VM image corresponding to the VM descriptor(s) set based on the respectively matching entry in the VM descriptor/software mapping data set.

6 Claims, 4 Drawing Sheets

(56) References Cited

U.S. PATENT DOCUMENTS

| | | | | |
|---|---|---|---|---|
| 2012/0246647 A1* | 9/2012 | Ciano | ................ | G06F 9/45533 718/1 |
| 2013/0014111 A1* | 1/2013 | Ciano | ................ | G06F 9/45558 718/1 |
| 2014/0040343 A1* | 2/2014 | Nickolov | .............. | G06F 9/4856 709/201 |

OTHER PUBLICATIONS

Whalley et al., "Licence-aware management of virtual machines", 2011 IFIP/IEEE International Symposium on Integrated Network Management (IM), May 23-27, 2011, Dublin, pp. 169-176, doi: 10.1109/INM.2011.5990688.

* cited by examiner

MAINTENANCE OF A SOFTWARE DISCOVERY CATALOG IN A VIRTUAL MACHINE ENVIRONMENT

BACKGROUND OF THE INVENTION

The present invention relates generally to the field of software license management, and more particularly to discovering usages of licensed software in a complex and dynamic virtual machine environment.

It is known to transfer software, from a supplier to a customer, in the form of a "sealed VM (virtual machine) image." The sealed VM image is deployed in the customer's virtualization environment so that the customer can use the software. The sealed VM image typically includes a self-contained virtual machine, controlled by an operating system, which runs one, or more, application(s) (that is, pieces of software that the customer wants to use). Typically, these applications are pre-configured because pre-configuration is relatively easy to do in a VM context. When the sealed VM image is up and running in the virtualization environment, it is referred to as a "virtual appliance." Through the use of these virtual appliances, customers typically can quickly, easily and reliably do the following things: (i) purchase and download a virtual appliance; (ii) set configuration details; and (iii) reach operational status.

DMTF OVF (distributed management task force open virtualization format, also sometimes referred to herein, more simply, as OVF) is a common packaging format for independent software vendors (ISVs) to package and securely distribute virtual appliances, enabling cross-platform portability. By packaging virtual appliances in OVF, ISVs can create a single, pre-packaged appliance that can run on customers' virtualization platforms of choice. For example, within OVF, information about the vendor, and the product can be stored which later, can be accessed through VM Manager. Descriptors included within a product packaged in OVF format may provide information about the installed software such as product name, vendor name, software version, product URL (universal resource locator) and/or vendor URL, etc. OVF can group descriptors into sections such as discs, network, resource, product, EULA (end user license agreement) terms, etc. OVF descriptors are conventionally used to provide additional information on VM in VM Manager.

Software asset management (SAM) tools are a known type of software. SAM is a traditional way of registering and tracking traditional (that is, non-sealed-VM-image type) software which are installed and used in an organization or enterprise. Typically, SAM is an important tool for asset management related activities, such as tracking activities related to software license payments (see definition of "asset management" related below in the Definitions sub-section of the detailed description section).

SUMMARY

According to an aspect of the present invention, there is a method, computer program product and/or system that performs the following operations (not necessarily in the following order): (i) collecting a set of virtual machine (VM) descriptor(s) sets, where each VM descriptor(s) set corresponds to one of the following: a VM appliance or a sealed VM image; (ii) for each VM descriptor(s) set of the set of VM descriptor(s) set(s), determining whether there is a match to an entry in a VM descriptor set/software application mapping data set; and (iii) for each VM descriptor(s) set of the set of VM descriptor(s) set(s), on condition that there is a match, determining an identity of a set of software application(s) in the VM appliance or sealed VM image corresponding to the VM descriptor(s) set based on the respectively matching entry in the VM descriptor/software mapping data set.

DETAILED DESCRIPTION

Figure 1:
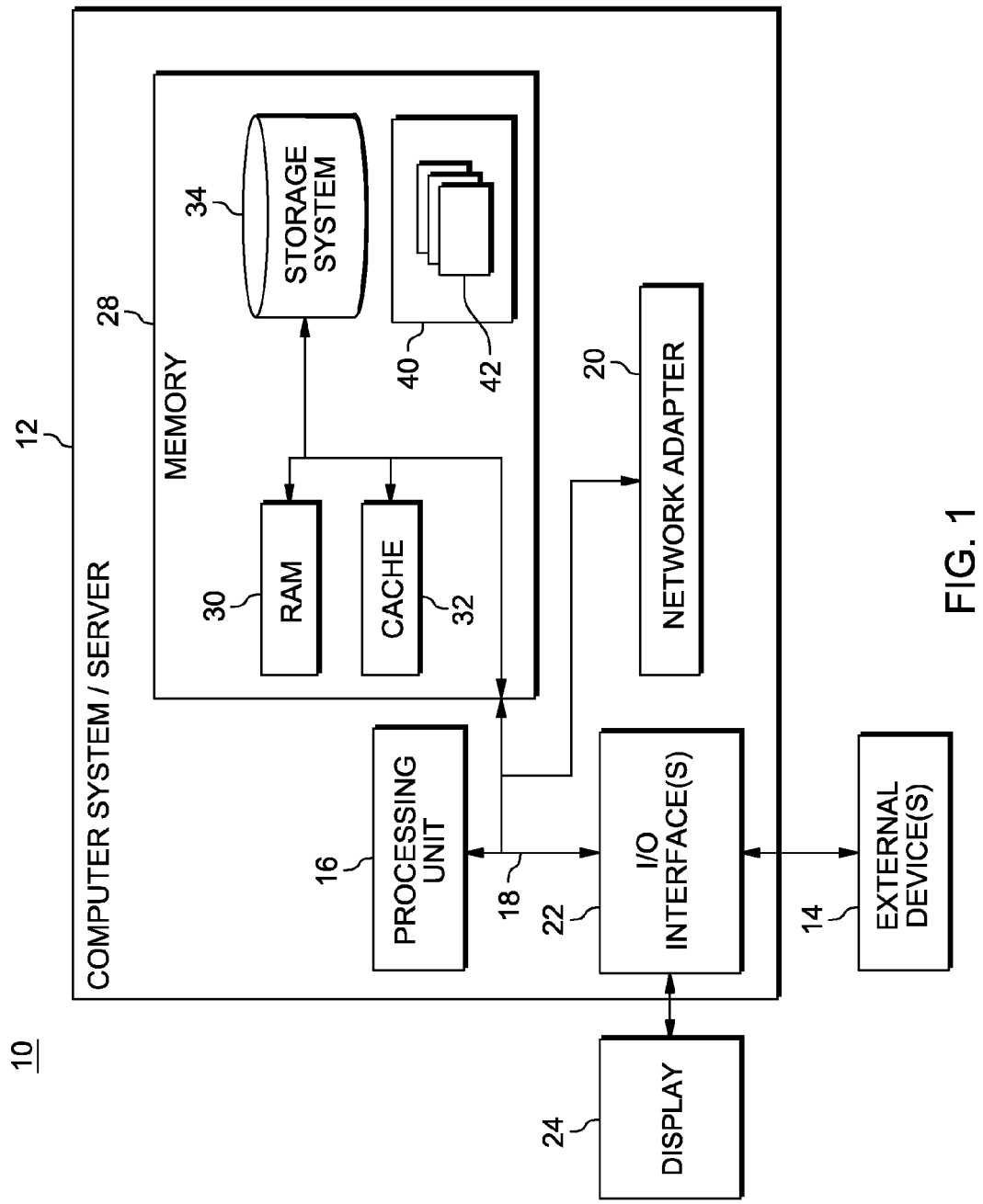
FIG. 1 depicts a cloud computing node used in a first embodiment of a system according to the present invention.

In some embodiments of the present invention, OVF descriptors (or other similar VM descriptors) are used for discovery of software applications that will be run through and in the VM corresponding to the VM image to which the VM descriptor(s) relate. In some embodiments of the present invention, correlations between VM descriptors, and the software application(s) in the VM image are: (i) predetermined and known; and/or (ii) determined by machine logic using historical data collected from multiple (often a very large number) of VMs that are running software applications where both the VM descriptors and the software applications running in and through the VM are known. In some embodiments, VM descriptor information, and information about software running in and through the VMs, (that is, historical data) is gathered across a whole computer network infrastructure. For example, if a given set of VM descriptor(s) of a VM sealed image is "software vendor specific," then: (i) this information can be used to make a "descriptor/software mapping" in a "descriptor/software application catalog;" and/or (ii) the descriptor/software mapping catalog (or table) can be used as a basis for asset management related activities (see definition of "asset management" related below in the Definitions sub-section of the detailed description section), such as determining a set of software application licenses that are required.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
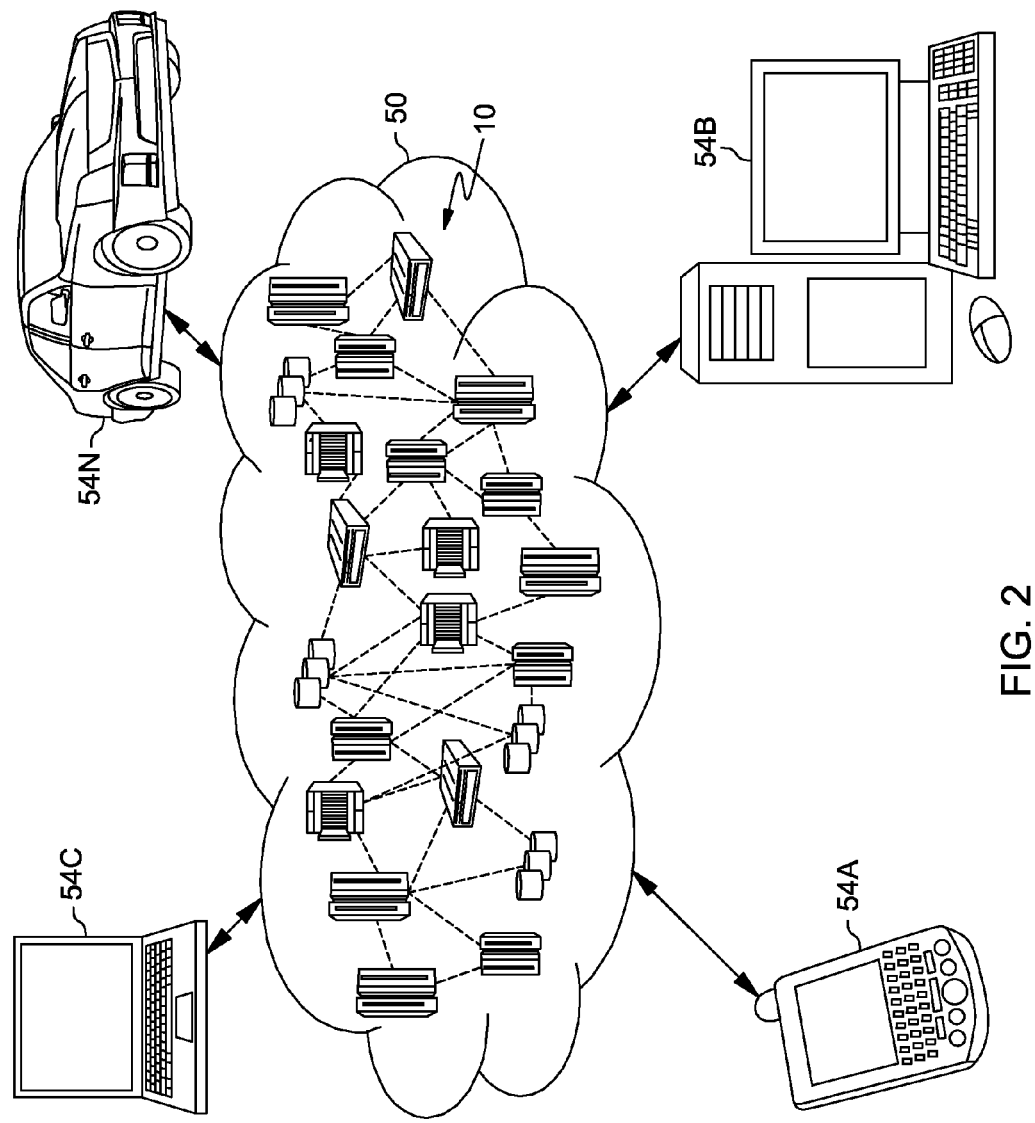
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
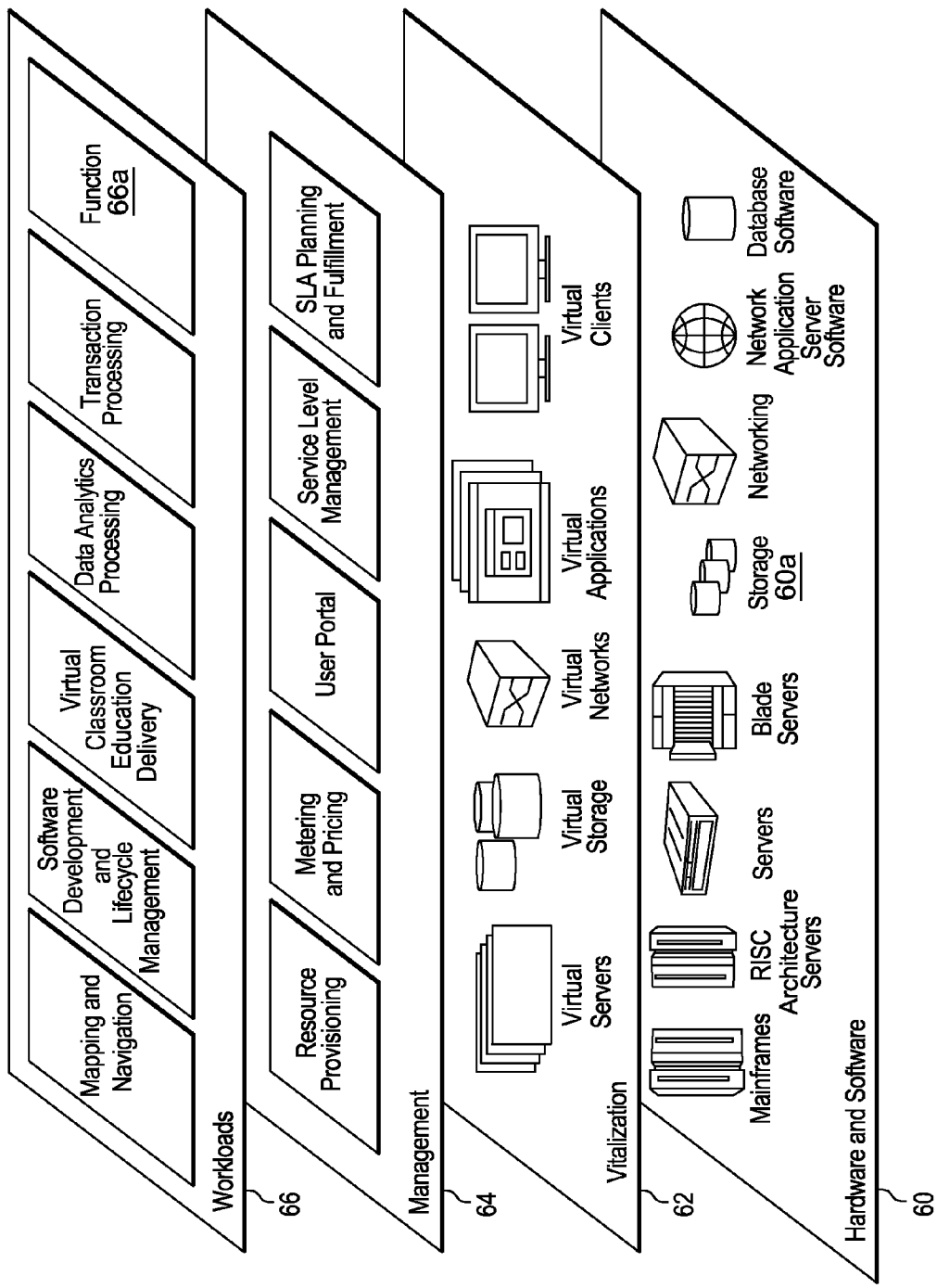
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

II. EXAMPLE EMBODIMENT

Figure 4:
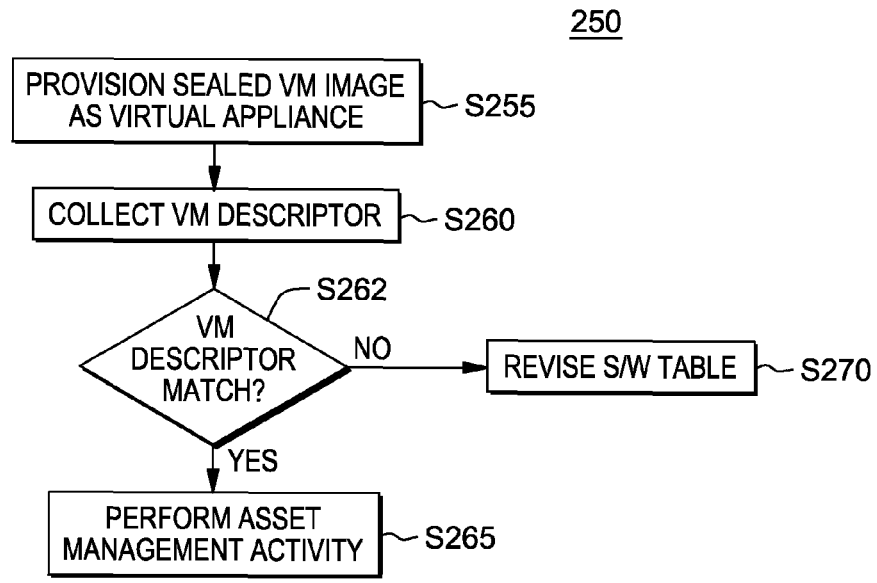
FIG. 4 is a flowchart showing a first embodiment method performed, at least in part, by the first embodiment system.
Figure 5:
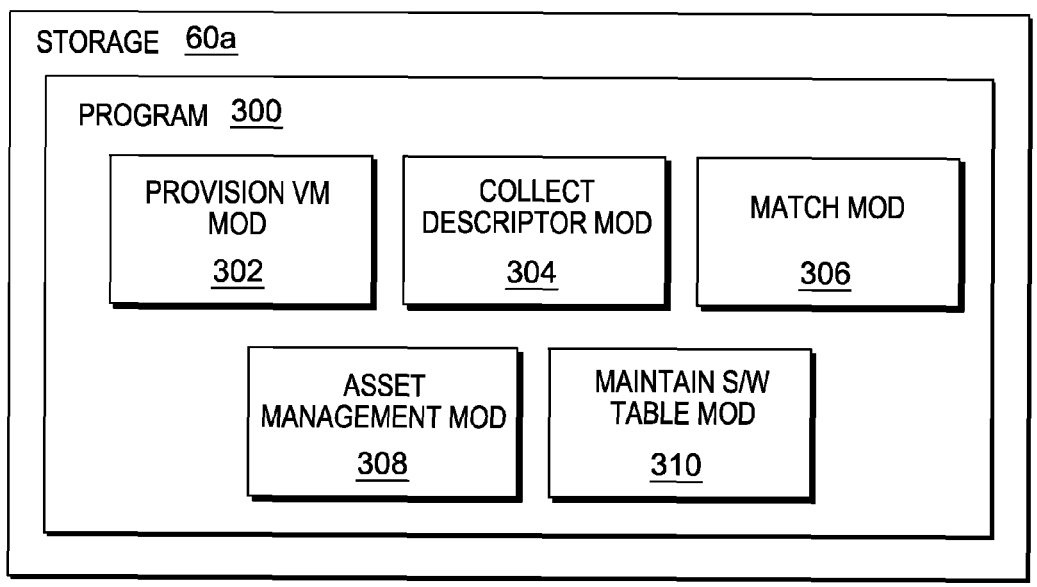
FIG. 5 is a block diagram showing a machine logic (for example, software) portion of the first embodiment system.

FIG. 4 shows flowchart 250 depicting a method according to the present invention. FIG. 5 shows program 300 for performing at least some of the method steps of flowchart 250. This method and associated software will now be discussed, over the course of the following paragraphs, with extensive reference to FIG. 4 (for the method step blocks) and FIG. 5 (for the software blocks). One physical location where program 300 of FIG. 5 may be stored is in storage block 60a (see FIG. 3).

Processing begins at step S255, where provision VM module ("mod") 302 provisions a sealed VM image (not separately shown), including a software application (not shown in the Figures). In this example, the software application is called "Spread Sheet Program," or, more simply "SS Prog". The sealed VM image, with SS Prog in it, is provisioned to run on computer system 12 (see FIG. 1) as a VM appliance (not separately shown). In this example, the Spread Sheet Program includes, within its code (which is a part of the running VM appliance), some Software Asset Management data, such as conventional SAM signatures. However, in this embodiment, this conventional SAM data is not used because it does not allow for asset management as reliable as that provided by the method under discussion. There is more detailed discussion of potential problems with using conventional SAM data in a VM appliance context, below, in the first paragraph of the Further Comments And/Or Embodiments sub-section of this Detailed Description section.

Processing proceeds to step S260, where collect descriptor mod 304 collects all VM descriptors included in the code of the newly-running VM appliance provisioned at step S255. As mentioned above, one currently-popular type of VM descriptor code are OVF descriptor codes. However, in this example of the method of FIG. 4, the example descriptor codes will not follow OVF format in order to simplify the explanations. It is important to note that the descriptor code collected at step S260 is a "VM descriptor code" because it is designed and/or constructed to correspond with the entirety of a sealed VM image and/or the entirety of a running VM appliance provisioned from a sealed VM image. A "VM descriptor code" should not be confused with various SAM data that relate only to an application that is included as part of a sealed VM image. In this example, there is only one VM descriptor code for the VM appliance provisioned at step S255, specifically VM descriptor code "ABF." In this embodiment, the VM descriptor(s) set (that is "ABF" only), is collected through network 50 (see FIG. 2), so that the physical computer where the VM appliance is provisioned is a different physical computer than the physical computer that runs program 300. Alternatively, the VM appliance and the program for matching VM descriptor(s) sets may be on the same physical computer.

Processing proceeds to step S262, where match mod 306 determines whether the set of descriptor code(s) collected at step S260 match any rows of a VM descriptor/software mapping table. In this example, the VM descriptor/software mapping table, stored in match mod 306, reads as follows:

| VM Descr 1 | VM Descr 2 | S/W App 1 | S/W App 2 |
|---|---|---|---|
| ABC | N16 | SS Prog | WP Prog |
| ABE | M23 | WP Prog | null |
| ZEF | null | Game A Prog | null |
| N6H | QR7 | Game A Prog | Game B Prog |
| ZZZ | null | Tax Prog | null |

In this embodiment, the software application(s) are identified by name. Alternatively, the software application(s) for a given VM descriptor(s) set may correspond to a software signature (such as a predetermined SAM software signature conventionally used with conventional SAM agent software.

As can be seen from the above table, code "ABF" (with no second VM descriptor code) does not match the VM descriptor code set portion of any of the rows of the VM descriptor/software mapping table. Because there is no match, processing, for this example will continue (as to be discussed below) with step S270.

However, assume that there had been a match between the VM descriptor set collected at step S260 and one of the rows of the table. If that had happened, the third and fourth columns of the table would reveal the identity(ies) of the software applications included in the VM appliance provisioned at step S255. In this case, processing would proceed from step S262 to step S265, where asset management mod 308 would perform one, or more, asset management related activities (such as preparing a license payment based on the Spread Sheet Program of the newly-provisioned VM appliance).

As mentioned above, in this example, due to the lack of a VM descriptor set match in the VM descriptor/software mapping table, processing proceeds from step S262 to step S270, where maintain software table mod 310 determines whether the VM descriptor/software mapping table should be updated to include a new row for the new VM descriptor set. In this example, computer 12 (see FIG. 1), host of the newly-provisioned virtual appliance, is automatically queried by mod 310 to determine what software applications are included in the newly-provisioned VM appliance. Alternatively, the identity of the software applications of the newly-provisioned VM appliance may be determined other ways, such as by human intervention. In some embodiments, the SAM data of the Spread Sheet Program running in the newly-provisioned VM appliance may be used in this software application determination.

In this example, it is determined that the software on the newly-provisioned VM appliance is limited to a single application, which is called Spread Sheet Program, as mentioned above in the discussion of step S255. As it turns out, this is the tenth time that a newly-provisioned virtual appliance has returned a VM descriptor(s) set of "ABF" (only), and all ten of these times, the software of the VM appliance has been identified as "Spread Sheet Program" (only). In this example, when a VM descriptor(s) set, which is missing from the VM descriptor/software mapping table, is discovered ten times, and all ten of those times the VM descriptor(s) set is associated with the same set of software application(s) (that is, a counter variable reaches a threshold value of 10), then mod 310 adds a row to the VM descriptor/software mapping table. Other values could be used for the threshold, and some embodiments even may set this threshold as low as one (1), meaning that the catalog is changed each and every time a new set of VM descriptor code(s) is detected. The next sub-section of this Detailed Description section will discuss how some embodiments of the present invention effect catalog updates by placing unmatched entries in "raw inventory."

Accordingly, in this example where VM descriptor(s) set "ABF" has just been encountered for the tenth time, a row is added to the VM descriptor/software mapping table of mod 308 as follows:

| VM Descr 1 | VM Descr 2 | S/W App 1 | S/W App 2 |
|---|---|---|---|
| ABC | N16 | SS Prog | WP Prog |
| ABE | M23 | WP Prog | null |
| ABF | null | SS Prog | null |
| ZEF | null | Game A Prog | null |

-continued

| VM Descr 1 | VM Descr 2 | S/W App 1 | S/W App 2 |
|---|---|---|---|
| N6H | QR7 | Game A Prog | Game B Prog |
| ZZZ | null | Tax Prog | null |

III. FURTHER COMMENTS AND/OR EMBODIMENTS

Some embodiments of the present invention recognize it is difficult to efficiently manage licenses for software delivered as sealed VM images and installed as virtual appliances, for reasons which may include: (i) a virtual appliance may not be deployable on systems managed by a SAM (software asset management) agent because such images are typically closed for installation of additional software; (ii) there may be multiple VMs operating within a single VM image; and/or (iii) the number of VMs operating in a VM environment may continuously change due to ongoing deletion and/or addition of new servers.

Some embodiments of the present invention may include one, or more, of the following features, characteristics and/or advantages: (i) use VM descriptors and/or patterns in performing asset management related functions related to software applications included in a sealed VM package and/or running as part of a VM virtual appliance (see definition of "asset management" related below in the Definitions sub-section of the detailed description section); (ii) use open virtual format (OVF) VM descriptors and/or patterns in performing asset management functions related to software applications included in a sealed VM package and/or running as part of a VM virtual appliance; (iii) use VM descriptors as software signatures and/or map VM descriptors to pre-existing software signatures (for example, pre-existing SAM software signatures; and/or (iv) use raw data for harvesting signatures (for example, SAM signatures of software applications present in a sealed VM image), using neither VM image nor VM appliance instrumentation. This approach of using VM descriptors for software asset management enables efficient management of software discovery and licensing for VM based software appliances.

One embodiment of a method of performing software asset management, based upon VM descriptors, will now be discussed in the following paragraphs.

OPERATION A: A SAM tool, according to this particular embodiment of the present invention, collects, from a VM manager program, VM descriptors for all provisioned virtual appliances. For example, a set of VM descriptors (specifically OVF descriptors) that reflect stored information about vendor, product and version for one of the virtual appliances running in a networked computers system (sometimes herein referred to as an "environment") may be as follows:

```
<ProductSection>
    <Info>Information about the installed software</Info>
    <Product>V-Sherbet Manager</Product>
    <Vendor>ABC Products, Inc.</Vendor>
    <Version>5.5.0-1317534</Version>
<ProductUrl>http://www.abcproducts.com/products/vsherbet-manager</ProductUrl>
    <VendorUrl>http://www.abcproducts.com</VendorUrl>
</ProductSection>
```

This is part of the VM descriptor information accessed, by SAM tool, through the VM Manager. As mentioned above, OVF provides many other descriptors (divided into sections such as discs, network, resource, product, Eula legal terms etc.), which may be useful for asset management purposes according to various embodiments of the present invention.

OPERATION B: After the collection of Operation A, collected descriptors are compared against new type of software signatures. The signature has defined as a list of descriptor(s) and pattern(s) which need to be matched (for example, vendor, product, version fields with given exact values or regular expression (for example, 5.5|5.5.*)). In this example, the list elements are combined into logical expressions as follows:

```
ProductSection\Product equals "vSherbet Manager Standard"
    AND
ProductSection\Vendor contains "ABC*"
    AND
ProductSection\Version contains "5.5|5.5.*"
    OR
EulaSection\Info contains "vSherbet Manager 5.5* Standard
Edition License agreement"
    OR
ANY contains "vSherbet Manager 5.5* Standard*"
```

OPERATION C: If the signature is matched, then the SAM tool reports discovered software and VM machine identifier (in this example, network address).

OPERATION D: If no signature is matched, the descriptors not matched (sometimes herein referred to as "not-matched descriptors") are reported as raw inventory data like ProductSection, EulaSection, etc. In this embodiment, this information will be sent to the SAM tool. Alternatively, the SAM tool itself may be expanded to handle VM-descriptor-to-SAM-software-signature-matching "raw inventory data" and not-matched VM descriptors.

OPERATION E: Identical entries from multiple users in the environment are grouped and presented to a SAM admin (in this embodiment, the SAM admin is a person). The SAM admin, based on the number of identical entries from the collection throughout the entire environment, approves the vendor, software and release identified in the identical, unmatched entries provided by the raw inventory descriptors at Operation D. In this embodiment, the human SAM admin uses her professional judgment, and/or independent research, to determine how many identical, unmatched entries must be in "raw inventory" before the software catalog is updated.

OPERATION F: Once approved by the human SAM admin, gathered raw inventory data is used to automatically create software discovery signature suitable for use with SAM. An example of this automatic software signature generation is as follows:

VM1 OVF Descriptor Code:

```
<ProductSection>
    <Product>My ERP Solution</Product>
    <Vendor>ERP Software Vendor</Vendor>
    <Version>5.5.0</Version>
</ProductSection>
```

VM2 OVF Descriptor Code:

```
<ProductSection>
    <Product>My ERP Solution</Product>
    <Vendor>ERP Software Vendor</Vendor>
```

-continued

```
    <Version>5.5.3</Version>
  </ProductSection>
```

VM3 OVF Descriptor Code:

```
  <ProductSection>
    <Product>My ERP Solution</Product>
    <Vendor>ERP Software Vendor</Vendor>
    <Version>5.6.0</Version>
  </ProductSection>
```

This embodiment of the present invention uses machine logic to convert the VM descriptor data into SAM software signature string data as follows:

```
ERP Software Vendor; My ERP Solution; 5.5 -> VM1, VM2
ERP Software Vendor; My ERP Solution ; 5.6 -> VM3
```

In this embodiment, the human SAM admin must approve the SAM software signature string data before it is added to the catalog. In this embodiment, the human SAM admin can also make revisions to the SAM data which was originally automatically generated by machine logic. In this way, the embodiment under discussion automatically creates and/or maintains an ISV software catalog, which catalog will tend to be well suited to customer environment.

Some embodiments of the present invention may include one, or more, improvements in processing VM Manager data as follows: (i) skip/ignore machines with deployed and running SAM agent (for example, provisioned machine has SAM agent by default); and/or (ii) suggest installing SAM solution agent when VM was not recognized or raw inventory data does not provide sufficient level of details (deep discovery of all sub-components and features, needed i.e. for advanced patch/license management).

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Asset management (or asset management related): includes, but is not necessarily limited to: managing and optimizing a software purchase (that is, license or sale); performing license or sale payment related activities (such as determining an amount of license payments due to various licensors); deployment; maintenance; utilization, and disposal; designing infrastructure and processes necessary for the effective management, control and protection of the software assets; reducing information technology (IT) costs; limiting business and legal risk related to the ownership and use of software; and/or maximizing IT (information technology) responsiveness and end-user productivity.

What is claimed is:

1. A method comprising:
    receiving a machine readable mapping table such that each record in the mapping table corresponds to a VM appliance or sealed VM image (VMA/SVMI), and each record includes: (i) a VM descriptor identifying an instantiation of a VMA/SVMI, and (ii) an identification of a set of attributes included in the corresponding VMA/SVMI;
    receiving a plurality of VM instantiation data sets including information each indicative of an instantiation of a VMA/SVMI, with each VM instantiation data set including a VM descriptor identifying the instantiation of the VMA/SVMI and a set of attributes of the corresponding VMA/SVMI instantiation;
    determining if there is a match between: (i) a VM descriptor identifying an instantiation of a VMA/SVMI, of each of the plurality of VM instantiation data sets, and (ii) a VM descriptor of a record in the mapping table;
    responsive to each determination of a match, determining the attributes in the first VM instantiation based upon the matching record in the mapping table;
    responsive to each determination that the VM descriptor does not match any descriptors in the machine readable mapping table, storing each of the unmatched VM instantiation data sets, corresponding to each VM descriptor that was not determined to match, to a raw inventory;
    determining that a subset of VM instantiation data sets, comprising at least two unmatched VM instantiation data sets stored in the raw inventory, are identical;
    responsive to the determination that the subset of VM instantiation data sets are identical, creating a VM descriptor that identifies the VMA/SVMI instantiations corresponding to the subset of VM instantiation data sets based on the set of attributes of the subset of VM instantiation data sets; and
    updating the mapping table with the created VM descriptor and corresponding set of attributes.

2. The method of claim 1 wherein the corresponding set of attributes of the created VM descriptor includes a tuple of attributes.

3. A non-transitory computer program product comprising a computer readable storage medium having stored thereon:
    first program instructions programmed to receive a machine readable mapping table such that each record in the mapping table corresponds to a VM appliance or sealed VM image (VMA/SVMI), and each record includes: (i) a VM descriptor identifying an instantiation of a VMA/SVMI, and (ii) an identification of a set of attributes included in the corresponding VMA/SVMI;

second program instructions programmed to receive a plurality of VM instantiation data sets including information each indicative of an instantiation of a VMA/SVMI, with each VM instantiation data set including a VM descriptor identifying the instantiation of the VMA/SVMI and a set of attributes of the corresponding VMA/SVMI instantiation;

third program instructions programmed to determine if there is a match between: (i) a VM descriptor identifying an instantiation of a VMA/SVMI, of each of the plurality of VM instantiation data sets, and (ii) a VM descriptor of a record in the mapping table;

responsive to each determination of a match, fourth program instructions programmed to determine the attributes in the first VM instantiation based upon the matching record in the mapping table;

responsive to each determination that the VM descriptor does not match any descriptors in the machine readable mapping table, fifth program instructions programmed to store each of the unmatched VM instantiation data sets, corresponding to each VM descriptor that was not determined to match, to a raw inventory;

sixth program instructions programmed to determine that a subset of VM instantiation data sets, comprising at least two unmatched VM instantiation data sets stored in the raw inventory, are identical;

responsive to the determination that the subset of VM instantiation data sets are identical, seventh program instructions programmed to create a VM descriptor that identifies the VMA/SVMI instantiations corresponding to the subset of VM instantiation data sets based on the set of attributes of the subset of VM instantiation data sets; and eighth program instructions programmed to update the mapping table with the created VM descriptor and corresponding set of attributes.

4. The computer program product of claim 3 wherein the corresponding set of attributes of the created VM descriptor includes a tuple of attributes.

5. A computer system comprising:
one or more processors; and
a computer readable storage medium;
wherein:
the one or more processors are structured, located, connected and programmed to run program instructions stored on the computer readable storage medium;

and the program instructions include:

first program instructions programmed to receive a machine readable mapping table such that each record in the mapping table corresponds to a VM appliance or sealed VM image (VMA/SVMI), and each record includes: (i) a VM descriptor identifying an instantiation of a VMA/SVMI, and (ii) an identification of a set of attributes included in the corresponding VMA/SVMI;

second program instructions programmed to receive a plurality of VM instantiation data sets including information each indicative of an instantiation of a VMA/SVMI, with each VM instantiation data set including a VM descriptor identifying the instantiation of the VMA/SVMI and a set of attributes of the corresponding VMA/SVMI instantiation;

third program instructions programmed to determine if there is a match between: (i) a VM descriptor identifying an instantiation of a VMA/SVMI, of each of the plurality of VM instantiation data sets, and (ii) a VM descriptor of a record in the mapping table;

responsive to each determination of a match, fourth program instructions programmed to determine the attributes in the first VM instantiation based upon the matching record in the mapping table;

responsive to each determination that the VM descriptor does not match any descriptors in the machine readable mapping table, fifth program instructions programmed to store each of the unmatched VM instantiation data sets, corresponding to each VM descriptor that was not determined to match, to a raw inventory;

sixth program instructions programmed to determine that a subset of VM instantiation data sets, comprising at least two unmatched VM instantiation data sets stored in the raw inventory, are identical;

responsive to the determination that the subset of VM instantiation data sets are identical, seventh program instructions programmed to create a VM descriptor that identifies the VMA/SVMI instantiations corresponding to the subset of VM instantiation data sets based on the set of attributes of the subset of VM instantiation data sets; and eighth program instructions programmed to update the mapping table with the created VM descriptor and corresponding set of attributes.

6. The computer system of claim 5 wherein the corresponding set of attributes of the created VM descriptor includes a tuple of attributes.

* * * * *